April 24, 1951  J. A. SEAMAN, JR  2,549,938
SLIDABLE COVER FOR TRUCK BODIES
Filed Feb. 18, 1949  2 Sheets-Sheet 1
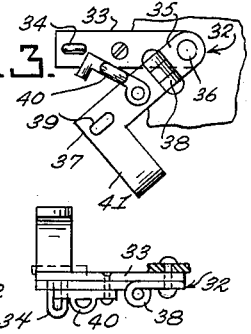
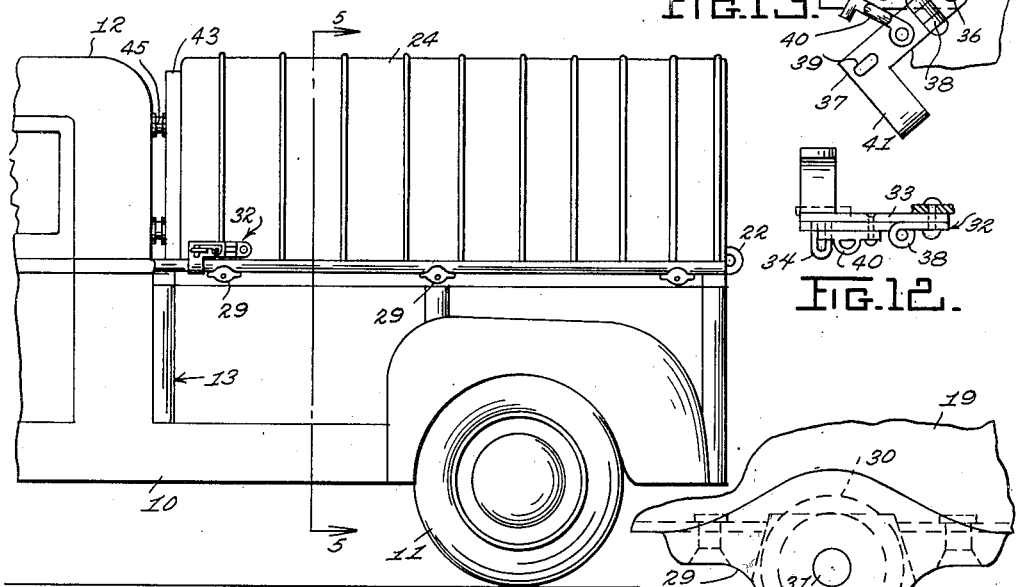
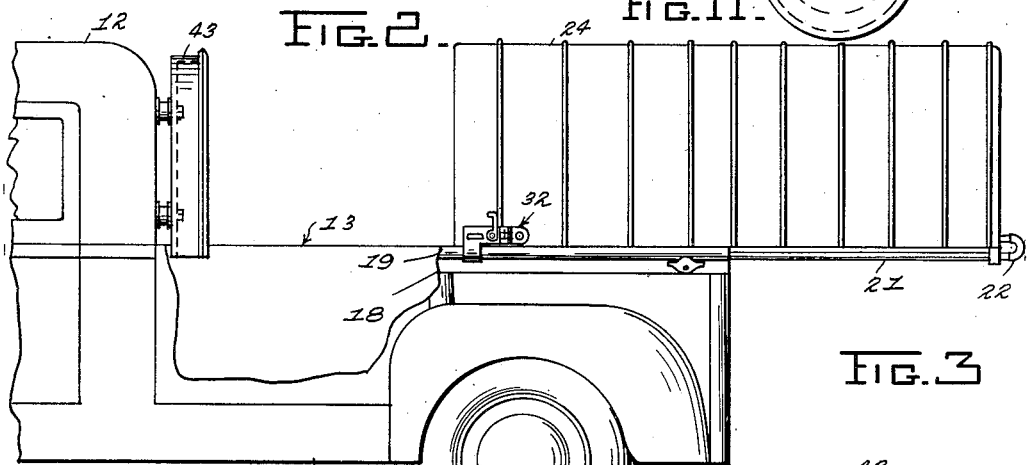
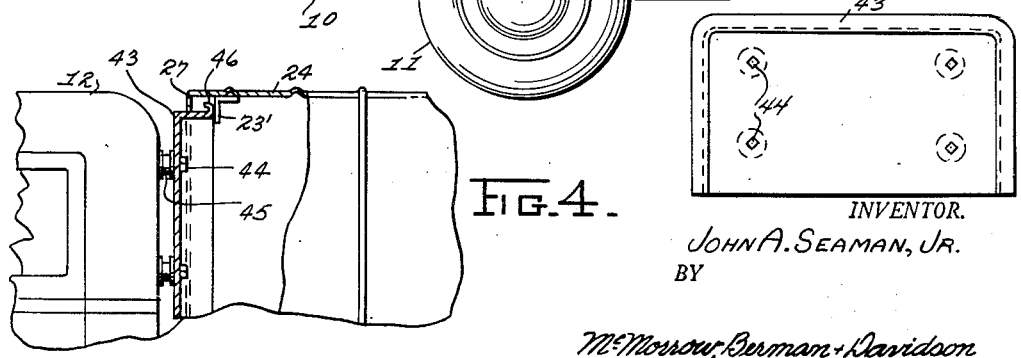
INVENTOR.
John A. Seaman, Jr.
BY
McMorrow, Berman & Davidson
ATTORNEYS April 24, 1951 J. A. SEAMAN, JR 2,549,938
SLIDABLE COVER FOR TRUCK BODIES
Filed Feb. 18, 1949 2 Sheets-Sheet 2
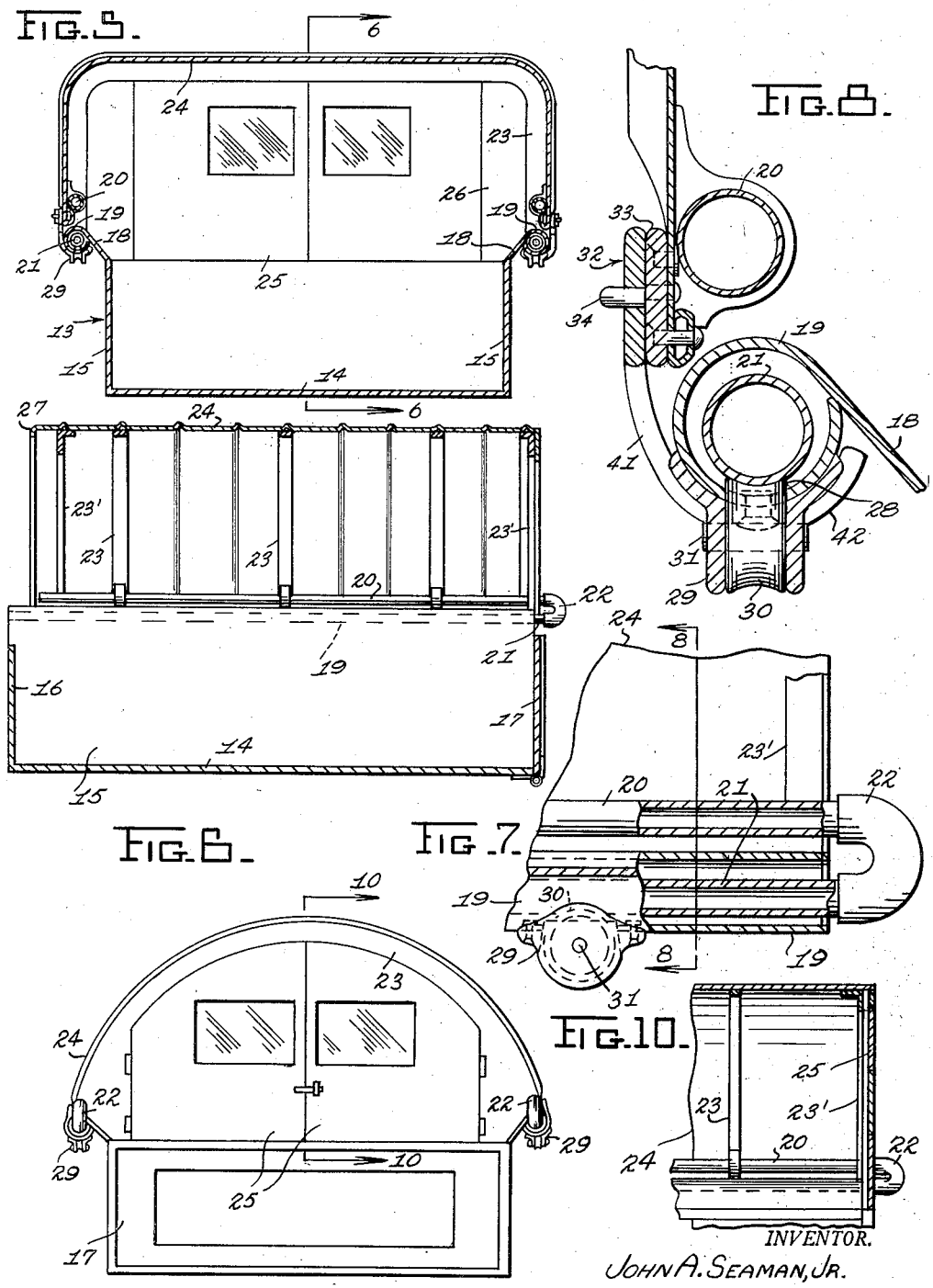
INVENTOR.
John A. Seaman, Jr.
BY
McMorrow, Berman & Davidson
ATTORNEYS

Patented Apr. 24, 1951

2,549,938

UNITED STATES PATENT OFFICE 2,549,938

SLIDABLE COVER FOR TRUCK BODIES

John A. Seaman, Jr., McMinnville, Tenn.

Application February 18, 1949, Serial No. 77,166

4 Claims. (Cl. 296—104)

This invention relates to covers for truck or wagon bodies, and more particularly to a slidably mounted cover which completely encloses the top of a vehicle body, and is movable lengthwise of the body to expose the top of the body to any desired extent.

It is among the objects of the invention to provide an improved truck or wagon body cover which has a closed end, and closes at its opposite end with a vehicle-carried wall to provide a complete closure for the top of the vehicle body, which is easily slidable lengthwise of the body to expose the top of the body to any desired extent, and may be positively stopped in various positions lengthwise of the body, which is easy to assemble with and disassemble from a vehicle body, and requires only minor modifications of the body structure for its installation, and which is light in weight, simple and durable in construction and extremely economical to manufacture.

Other objects and advantages will become apparent from a consideration of the following description and the appended claims in conjunction with the accompanying drawings, wherein:

Figure 1 is a side elevation of a fragmentary rear portion of a motor truck showing the truck body and a slidable cover illustrative of the invention mounted on the body and positioned in closed position;

Figure 2 is a view similar to Figure 1 showing the cover moved rearwardly to a partly-open position;

Figure 3 is a rear elevation of a vehicle-carried front wall for the cover;

Figure 4 is a fragmentary side elevation of the truck cab, the vehicle-carried front wall and the cover, a portion being broken away and shown in cross-section to illustrate the operative association of the front end of the cover with the vehicle-carried front wall;

Figure 5 is a transverse cross-section of the body and cover taken substantially on the line 5—5 of Figure 1;

Figure 6 is a longitudinal, medial cross-section of the body and cover taken substantially on the line 6—6 of Figure 5;

Figure 7 is a fragmentary elevation on an enlarged scale of the rear portion of one of the side supports for the cover, a portion being broken away and shown in cross-section to better illustrate the construction of such side support;

Figure 8 is a transverse cross-section taken substantially on the line 8—8 of Figure 7;

Figure 9 is a rear elevation of the truck body and slidable cover;

Figure 10 is a longitudinal cross-section of a fragmentary rear portion of the cover taken substantially on the line 10—10 of Figure 9;

Figure 11 is a side elevation on a somewhat enlarged scale of one of the cover-supporting roller assemblies illustrated in Figures 1 and 2;

Figure 12 is a top plan view of a latch for retaining the cover in operative assembly with the vehicle body; and Figure 13 is a side elevation of the latch illustrated in Figure 12.

Referring to the drawings, in detail, there is illustrated a conventional motor truck of the "pick-up" type, although it is to be understood that the slidable cover is in no way limited to this particular type of truck, but may be used on the bodies of various types of vehicles, motor-driven, or otherwise, as may be found convenient or desirable.

The truck illustrated has a frame or chassis 10 supported by conventional front wheels, not illustrated, and rear wheels 11, and supporting a cab 12 and a bed or body, generally indicated at 13.

The body 13 is rectangular in shape and has a flat bottom wall or floor 14, upstanding side walls 15, a relatively fixed front wall 16 closing its front end, and a tail gate 17 closing its rear end and hinged at its bottom edge to the rear end of the floor 14, in the usual manner.

Each side wall 15 is provided along its upper edge with a longitudinally-extending, upwardly and outwardly-inclined flange 18, and the outer edges of these flanges are rolled to provide longitudinally-extending tubular formations 19 structurally integral with the body 13.

The cover-supporting structure comprises two sets of two parallel tubes in each set, each set having an upper tube 20 and a lower tube 21. The tubes 20 and 21 have a length substantially equal to the length of the truck body and are spaced apart a distance to conveniently receive the top portion of a respective tubular formation 19 therebetween. At their rear ends the two tubes of each set are connected by a 180-degree pipe-return bend 22.

A plurality of parallel, spaced-apart arched ribs 23 are secured at their opposite ends respectively to the upper tubes 20 of the two sets of cover-supporting tubes, and cover panels 24 overlie and are secured to the ribs 23 to complete the cover.

The arched ribs may be either rectangular or arcuate in shape, as particularly illustrated in Figures 5 and 9, and each rib has its ends spaced apart a distance substantially equal to the distance from one of the rolled tubular formations 19 of the body to the other such formation. Any desired number of ribs may be used, but five spaced-apart ribs, as illustrated in Figure 6, have been found to provide entirely satisfactory results in operation, the two end ribs being modified to an angle-shaped cross-section, as indicated at 23', to provide front and rear flanged structures adjacent the front and at the rear end of the cover.

A pair of closure doors 25 is hinged at their outer edges to the legs of the rear rib 23' or to the vertical edges of respective filler panels 26 secured to the legs of such rear rib to provide a rear closure for the cover, and the front end of the cover extends somewhat beyond the front rib 23' and is inwardly flanged, as indicated at 27.

In operation, each lower tube 21 is slidably received in a respective rolled tubular formation 19 of the body, and the entire cover is slidable forwardly and rearwardly relative to the body for assembly and disassembly, and to expose any desired portion of the top of the body. Each rolled formation 19 is provided, in its lower side, with a plurality of spaced-apart openings 28, and respective roller-carrying brackets 29 are secured to the under sides of the formation 19 in alignment with the openings 28. Respective rollers 30 are journaled in the brackets 29 by suitable respective axle pins 31, and project through the corresponding openings 28 into the interiors of the rolled formations 19 to provide anti-friction supports for the corresponding lower tubes 21 of the cover-supporting tube sets. While any desired number of tube-supporting rollers may be provided, it has been found convenient to provide three such rollers for each tubular formation 19, with one roller disposed adjacent each end of the corresponding tubular formation, and one roller disposed substantially at the mid-length location of the formation, as is particularly illustrated in Figure 1.

Two latches, as generally indicated at 32, are secured to the cover, one at each side of the cover adjacent the front end of the latter.

Each of the latches 32 comprises an elongated, flat plate 33 rigidly secured to the cover at the outside of the latter and carrying, near its forward end, an outwardly-extending staple 34. A hinge butt 35 is pivotally connected at its rearward end to the rearward end of the plate 33 by a pivot pin or rivet 36, and an angle plate 37 is hingedly connected to the forward end of the hinge butt 35 by a hinge joint 38 having an axis substantially perpendicular to the axis of the pivot joint provided by the pin or rivet 36. Near its forward end the angle plate 37 is provided with a slot 39 for receiving the staple 34, and a hook 40 is pivoted to the angle plate in position to project through the staple when the staple projects through the slot 39 to securely lock the angle plate in position against the fixed plate 33. The leg 41 of the angle plate remote from the hinge joint 38 is bent to provide a hook 42 which engages under the corresponding rolled tubular formation 19 of the truck body, so that the front end of the cover will not raise by cantilever action when the cover is slid rearwardly to a position such as that illustrated in Figure 2.

The roller brackets 29 will engage the latch hooks 42 and stop rearward movement of the cover at the corresponding locations. In order to continue rearward movement of the cover, the hooks 40 are released from the corresponding staples 34, the angle plates 37 pulled outwardly at their forward ends a sufficient distance to clear the corresponding staples, and the angle plates are then forced downwardly to the position illustrated in Figure 13, at which they will clear the roller brackets, so that rearward movement of the cover can be continued past the roller brackets, and the cover can be entirely removed from the body, if desired.

A flanged front wall 43 of a rectangular or arcuate shape, and of a size to fit within the front flange 27 of the cover, is secured to the rear wall of the truck cab 12 by suitable bolts 44 extending through the wall and through tubular spaces 45 interposed between the front wall 43 and the rear wall of the truck cab. This fixed front wall 43 preferably has an outwardly-turned flange 46 around its rearward edge, and the inwardly-directed leg of the front cover rib 23' contacts the outer side of this flange when the cover is in the forward position, illustrated in Figure 4, to provide a positive stop for forward movement of the cover.

When the cover is in its forward position the fixed front wall 43 provides a closure for the front end of the cover, and, at the same time, the doors 25 provide a closure for the rear end of the cover, so that the top of the vehicle body is completely enclosed.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination, a rectangular vehicle body having a front end and a rear end and having a rolled tubular formation along the upper edge of each of its side walls, each tubular formation being provided in its lower side with spaced apart openings, roller brackets secured to the under sides of the tubular formations and respectively underlying said openings, a roller journaled in each bracket and projecting through the corresponding opening, a lower tube slidable in each tubular formation and supported on the corresponding rollers, a pipe return bend secured to each lower tube at the rear end of said body, an upper tube secured at one end to each pipe return bend and extending toward the front end of said body in substantially parallel relationship to the corresponding lower tube, and an arched cover secured at its opposite edges to said upper tubes and slidably supported on said body by said tubes for movement forwardly and rearwardly of said body.

2. In combination, a rectangular vehicle body having a front end and a rear end and having a rolled tubular formation along the upper edge of each of its side walls, each tubular formation being provided in its lower side with spaced apart openings, roller brackets secured to the under sides of the tubular formations and respectively underlying said openings, a roller journaled in each bracket and projecting through the corresponding opening, a lower tube slidable in each tubular formation and supported on the corresponding rollers, a pipe return bend secured to the end of each lower tube at the rear end of said body, an upper tube secured at one end to each pipe return bend and extending toward the front end of said body in substantially parallel relationship to the corresponding lower tube, and an arched cover secured at its edges to said upper tubes and slidably supported on said body by said tubes for movement forwardly and rearwardly of said body, said cover comprising spaced apart ribs secured at their respectively opposite ends to said upper tubes and thin cover panels secured to said ribs.

3. In combination, a rectangular vehicle body having a front end and a rear end and having a rolled tubular formation along the upper edge of each of its side walls, each tubular formation being provided in its lower side with spaced apart openings, roller brackets secured to the under sides of the tubular formations and respectively underlying said openings, a roller journalled in each bracket and projecting through the corresponding opening, a lower tube slidable in each tubular formation and supported on the corresponding rollers, a pipe return bend secured to the end of each lower tube at the rear end of said body, an upper tube secured at one end to each pipe return bend and extending toward the front end of said body in substantially parallel relationship to the corresponding lower tube, an arched cover having a front end and a rear end secured at its opposite edges to said upper tubes and slidably supported on said body by said tubes for movement forwardly and rearwardly of said body, doors hinged to said cover at the rear end of the latter closing the rear end of said cover, and a fixed vehicle supported wall disposed at the front end of said body and engageable by said cover at the front end of the latter when the cover is in its limiting forward position relative to said body to close the front end of said cover.

4. In combination, a rectangular vehicle body having a front end and a rear end and having a rolled tubular formation along the upper edge of each of its side walls, each tubular formation being provided in its lower side with spaced apart openings, roller brackets secured to the under sides of the tubular formations and respectively underlying said openings, a roller journaled in each bracket and projecting through the corresponding opening, a lower tube slidable in each tubular formation and supported on the corresponding rollers, a pipe return bend secured to the end of each lower tube at the rear end of said body, an upper tube secured at one end to each pipe return bend and extending toward the front end of said body in substantially parallel realtionship to the corresponding lower tube, an arched cover having a front and a rear end secured at its opposite edges to said upper tubes and slidably supported on said body by said tubes for movement forwardly and rearwardly of said body, and latch devices secured to the opposite sides of said cover near the front end of the latter and engaging under the corresponding tubular formations of the vehicle body and against the adjacent roller brackets, said latch devices being releasable to pass said roller brackets when said cover is moved relative to said body.

JOHN A. SEAMAN, Jr.

REFERENCES CITED

The following references are of record in the file of this patent:

UNITED STATES PATENTS

| Number | Name | Date |
|---|---|---|
| 307,978 | Parks | Nov. 11, 1884 |
| 2,140,960 | Kercher | Dec. 20, 1938 |

FOREIGN PATENTS

| Number | Country | Date |
|---|---|---|
| 245,604 | Italy | Jan. 13, 1926 |
| 305,157 | Great Britain | Feb. 1, 1929 |